(12) United States Patent
Luo et al.

(10) Patent No.: US 10,089,392 B2
(45) Date of Patent: Oct. 2, 2018

(54) AUTOMATICALLY SELECTING THEMATICALLY REPRESENTATIVE MUSIC

(71) Applicant: Kodak Alaris Inc., Rochester, NY (US)

(72) Inventors: Jiebo Luo, Pittsford, NY (US); Dhiraj Joshi, Rochester, NY (US); Charles Parker, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 366 days.

(21) Appl. No.: 14/810,812

(22) Filed: Jul. 28, 2015

(65) Prior Publication Data

US 2015/0331943 A1  Nov. 19, 2015

Related U.S. Application Data

(62) Division of application No. 13/154,543, filed on Jun. 7, 2011, now Pat. No. 9,098,579.

(51) Int. Cl.
*G06F 17/30* (2006.01)

(52) U.S. Cl.
CPC .............. *G06F 17/30817* (2013.01)

(58) Field of Classification Search
CPC ................................................ G06F 17/30817
USPC ......... 1/1; 455/412.1; 707/722, 769; 725/34; 700/94

See application file for complete search history.

(56) References Cited

U.S. PATENT DOCUMENTS

| | | | |
|---|---|---|---|
| 2009/0112933 A1* | 4/2009 | Kato | G11B 27/034 |
| 2010/0070057 A1 | 3/2010 | Sugiyama | |
| 2010/0273610 A1 | 10/2010 | Johnson | |
| 2011/0054646 A1 | 3/2011 | Hernandez et al. | |
| 2012/0254234 A1* | 10/2012 | LaJoie | G06F 17/30775 707/769 |
| 2015/0245111 A1* | 8/2015 | Berry | G06F 17/30017 725/34 |

OTHER PUBLICATIONS

Luo et al., "Photo-centric Multimedia Authoring Enhances by Cross-Media Indexing," Proc. of SPIE, vol. 5960 596026-2, 2005.
Chen et al., "Tiling Slideshow," MM'06, Oct. 23-27, 2006, pp. 25-34.
Scaringella et al., "Automatic Genre Classification of Music Content," IEEE Signal Processing Magazone, Mar. 2006, pp. 133-141.
Encyclopedie de la Musique, Fasquelle, 1st trimestre 1961, No. 669, No. 3444, p. 701.

\* cited by examiner

*Primary Examiner* — Md S Elahee
(74) *Attorney, Agent, or Firm* — Hogan Lovells US LLP

(57) ABSTRACT

A method for automatically selecting thematically representative music is disclosed. A processor is used for using a theme-related keyword to search a keyword-indexed video repository to retrieve videos associated with the theme-related keyword; analyzing the retrieved videos to select videos with music; and extracting music tracks and features from the selected videos. The method further includes selecting representative music related to the theme from the extracted music tracks using the extracted features; and storing the selected representative music in a processor accessible memory.

11 Claims, 4 Drawing Sheets

AUTOMATICALLY SELECTING THEMATICALLY REPRESENTATIVE MUSIC

CROSS-REFERENCE TO RELATED APPLICATIONS

This application is a divisional of U.S. application Ser. No. 13/154,543, filed Jun. 7, 2011, which is hereby incorporated by reference in its entirety.

FIELD OF THE INVENTION

The present invention relates to the selection of thematically representative music which can be subsequently used by a user.

BACKGROUND OF THE INVENTION

Music has become an integral part of modern movies after early silent films, and is important in conveying the mood and setting of the film at any given moment, expressing character emotion, heightening drama, advancing the story, or even sometimes misleading the viewer. To enhance the personal media experience, music is also often inserted in the sound track during media authoring. For example, users typically choose an appropriate music for slide shows of photos, or add music to videos, primarily to help set the mood and emotion suitable for the content in the photos and video.

Given the aforementioned purpose, it is important to select the thematically representative music. At present, such music selection is manually performed by the users for a given media, or retrieved from an indexed music library to match the theme of the media. An example of the latter is described by Luo et al., "Photo-centric Multimedia Authoring Enhanced by Cross-Media Retrieval," in Proceedings of 2005 SPIE International Symposium on Visual Communication and Image Processing, where the theme (e.g., beach, mountain, city, fall foliage, etc.) of a photo collection is determined automatically by image classification, and a music of the matching theme is retrieved from a repertoire manually pre-indexed by related themes. Tiling slide shows by Chen et al., "Tiling slideshow," in Proceedings of 2006 ACM International Conference on Multimedia, describes a method for creating slide shows with matching beat music to improve user experience.

A theme in music composition is the material on which the composition is based. It can be a repeating musical expression such as found in Beethoven. The Encyclopedic Fasquelle (Michel 1958-61) defines a theme as "Any element, motif, or small musical piece that has given rise to some variation becomes thereby a theme."

However, the music theme contained in media production and media experience is different; it is semantic. Broadly speaking, these themes can be ethnographic (related to ethnic groups and other ethnic formations, their ethnogenesis, composition, resettlement, social welfare characteristics, as well as their material and spiritual culture), geographic (related to a geographic region or location), demographic (related to characteristics of a human population, including gender, race, age, income, disabilities, mobility (in terms of travel time to work or number of vehicles available), educational attainment, home ownership, employment status, and even location), or based on an event or activity.

Music selection based on semantic themes has been studied in the prior art. U.S. Patent Application Publication 20110054646 describes an entertainment system that has a music storage system storing a plurality of music pieces, a playback system coupled with the music storage system, a navigation system providing current map information including a present location, wherein a current map has a plurality of zones each being assigned to one of a plurality of zone types, and a controller for controlling playback of selected music pieces, wherein the controller maintains a plurality of playlists, each having a plurality of music pieces and being assigned to at least one zone type. The controller receives information of a present location and a current zone type and selects an assigned playlist, wherein the navigation system further provides information about a distance and/or time to a next zone. The controller modifies the assigned playlist such that a transition to the next zone is timely synchronized with the ending of a music piece of the assigned playlist.

U.S. Patent Application Publication 20100273610 describes systems and techniques for generating an athletic training program and selecting music for playing during the training program are described. Based on specified parameters, a training program module can generate a customized training program intended to help an athlete reach a goal. In conjunction therewith or independently thereof, a music selection module can generate a music playlist for playing during a training program. Music selection parameters can include training intensity, user speed, user location, user mood, a user's current performance (e.g., as compared to an expected performance) and the like. The music selection module can select songs from a personal library or a public database of music. Music selection can be made to maximize user motivation and inspiration.

U.S. Patent Application Publication 20100070057 relates to a system that automatically associates background music with an image slideshow. The system can receive a selected image collection, extract metadata from the image collection, and associate audio files with the image collection based on the metadata. The system will then prompt concurrent playing of the audio file while the image collection is displayed. The metadata identifies a theme for the image collection which can form the basis for associating the audio file with the image collection. This system is similar to Luo et al., "Photo-centric Multimedia Authoring Enhanced by Cross-Media Retrieval," in Proceedings of 2005 SPIE International Symposium on Visual Communication and Image Processing.

However, none of the prior art treats the music as already pre-indexed but does not disclose how to obtain music suitable for a given semantic theme.

Music theme classification is related to but different from music genre classification. Music can be divided into many genres in many different ways. These classifications are often arbitrary and controversial, and closely related styles often overlap. Many do not believe that generic classification of musical styles is possible in any logically consistent way, and also argue that doing so sets limitations and boundaries that hinder the development of music. While no one doubts that it is possible to note similarities between musical pieces, there are often exceptions and caveats associated. Labeling music with genres often does not reflect a specific culture, race, or time period. Larger genres consist of more specific subgenres. Common music genres include classic music, contemporary music, folk music, jazz, rock, country, and so on. For a survey on this topic, please see "Automatic genre classification of music content: a survey", N. Scaringella, G. Zoia, and D. Mlynek, *Signal Processing Magazine, IEEE*, Vol. 23, Nr. 2 (2006), p. 133-141.

In addition and very importantly, all of the above mentioned prior art assume that a collection of music already pre-exists for the purpose of music selection or music classification.

There is therefore a need for a system to first collect a set of potentially usefully music and then select from such a set of candidate music any music that is thematically representative.

SUMMARY OF THE INVENTION

In accordance with the present invention there is provided a method for automatically selecting thematically representative music, comprising using a processor for:

(a) using a theme-related keyword to search a keyword-indexed video repository to retrieve videos associated with the theme-related keyword;

(b) analyzing the retrieved videos to select videos with music;

(c) extracting music tracks and features from the selected videos;

(d) selecting representative music related to the theme from the extracted music tracks using the extracted features; and (e) storing the selected representative music in a processor accessible memory.

It is an advantage of the present invention to automatically collect a pool of candidate music tracks from a community source that supplies videos with a theme-related keyword, wherein some videos contain music selected by the users to potentially match the theme related to the keyword.

It has the additional advantage that automatic analysis is used to select representative music related to the theme from the extracted music tracks without any further human input.

DETAILED DESCRIPTION OF THE INVENTION

Figure 1:
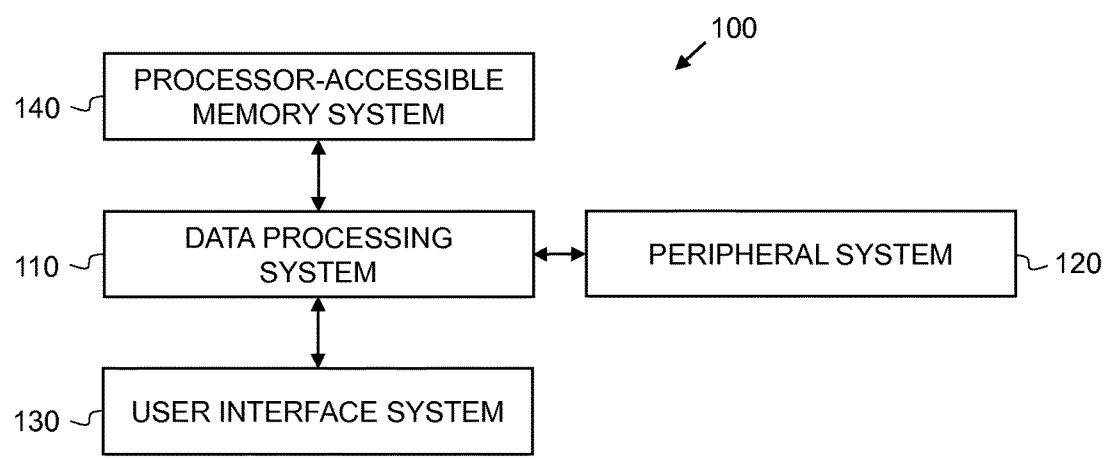
FIG. 1 is a block diagram of a computer system that will be used to practice an embodiment of the present invention.

FIG. 1 illustrates a system 100 for media reliving and browsing, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 2:
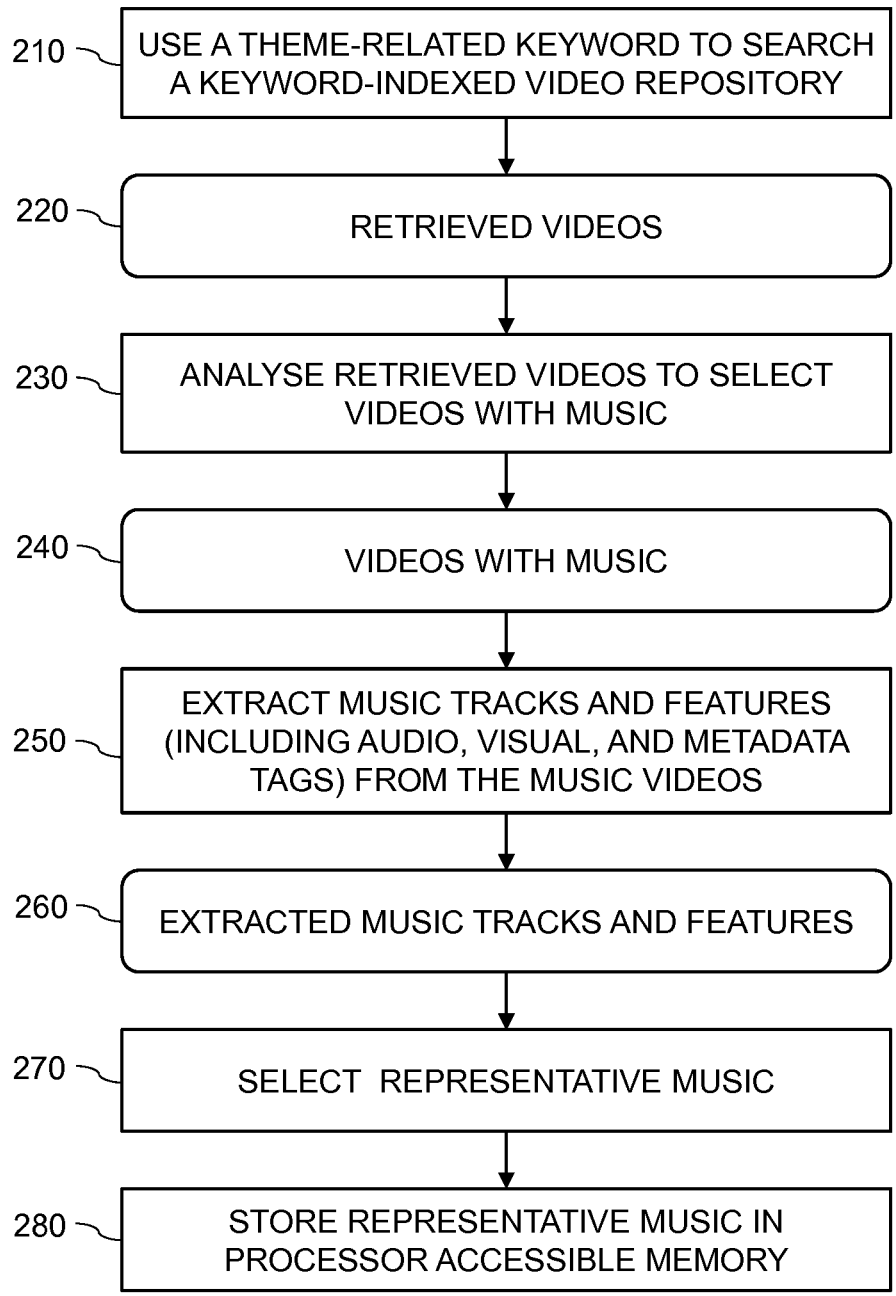
FIG. 2 is a block diagram of steps involved in the music selection process of the present invention.

The data processing system 110 includes one or more data processing devices that implement the processes of the various embodiments of the present invention, including the example process of FIG. 2. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention. The processor-accessible memory system 140 can be a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital images to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, an audio output device such as speakers, a processor-accessible memory, or any device or combination of devices to which data is output by the data processing system 110. In this regard, if the user interface system 130 includes a processor-accessible memory, such memory can be part of the processor-accessible memory system 140 even though the user interface system 130 and the processor-accessible memory system 140 are shown separately in FIG. 1.

The present invention builds an automatic system using the above mentioned processor to address the music selection problem mentioned in the background section.

FIG. 2 describes the steps required to automatically select thematically representative music in the absence of a pre-indexed music repository. A theme in music can be described as a semantic concept with which humans can associate the music. A theme can be ethnographic, geographic, demographic, or based on an event. Examples of the above category of themes are (i) Ethnographic—Bedouin, (ii) Geographic—Grand Canyon, (iii) Demographic—Baby-boomers, and (iv) Events—Christmas. A theme can be directly communicated by a user or determined automatically by analyzing images from an image collection of the user. Methods to determine event or activity in picture collections have been explored in research, an example of which is seen in the published article of Cao et al., Annotating Collections of Photos Using Hierarchical Event and Scene Models, IEEE International Conference on Computer Vision and Pattern Recognition, 2008.

In the present invention, the theme is converted into one or more theme-related keywords (e.g. Baby-boomer music). The theme-related keyword describes a theme in one or more words. In step 210, the theme-related keyword is used to search a keyword-indexed video repository. A keyword-indexed video repository is a database containing videos and associated keyword annotations describing the content of the videos. Importantly, the database has been pre-indexed with text keywords and permits video search with keywords. The keyword indexed video repository can (but is not required to) includes videos contributed from multiple sources (e.g., multiple users from an online media sharing community source). An example of a keyword-indexed video repository with videos contributed from multiple sources or community sources is YouTube.

The present inventions permits the use of multiple keywords, using associated keywords or synonyms, using boolean keyword logic or regular expressions of keywords.

There are several difficulties with such a keyword-indexed video repository from a community source. First, the videos in this repository are not established for the purpose of music selection. Rather the general purpose is for users to share media content with others in the community. Second, the keywords assigned by the users can be noisy and thus not always reflect correctly or accurately the semantic theme associated with the keyword. Third, although users could have used their own judgment and reasoning to select music tracks for their videos, their music selections may be limited by the choices available to them and also by their interpretation of the music. Consequently, even though there is wisdom of crowd embedded in the keyword-indexed video repository, it is nontrivial to identify thematically representative music from such a noisy source. The present invention provides a way to achieve that.

The retrieved videos 220 are provided to step 230. In step 230, the retrieved videos are analyzed to select only those videos with music 240. In an embodiment of the invention, this step is achieved by first extracting the audio track from video using FFmpeg open source software library followed by detection of music in audio. Music detection has been a key topic of existing audio research. An algorithm to detect music in audio is explained in the published article of Martin McKinney and Jeroen Breebaart, Features for Audio and Music Classification, Proceedings of the International Symposium on Music Information Retrieval, 2003.

In step 250, the videos with music 240 are processed to extract the music tracks and features 260 that are required for further steps. In an embodiment of the invention, music tracks are extracted using FFmpeg open source software library. Features in step 260 can include audio, visual, or metadata tags. In a preferred embodiment, the music track extracted is passed through a feature extraction algorithm, which reduces the digital sound information to 32-element vector of numbers as the audio feature. Out of the 32 numbers, the first 24 numbers represent the means and standard deviations of the first 12 Mel-frequency Cepstral Coefficients (MFCC) features, described in the published article of Paul Mermelstein, Distance Measures for Speech Recognition, Psychological and Instrumental, Pattern Recognition and Artificial Intelligence, 1976. MFCC features are extracted from consecutive 0.025 second time windows of the audio signal. The last 8 numbers (of the 32 numbers) represent the estimates and confidence values of estimates for tempo, time signature, key, and mode of the audio signal. Techniques for estimating these quantities are described in the published article of Steven Olivier Lartillot and Petri Toiviainen, A Matlab Toolbox for Musical Feature Extraction from Audio, Proceedings of the 10th International Conference on Digital Audio Effects, 2007.

Often visual patterns extracted from a music video can also throw light on its relevance for a particular theme, for example, (i) certain types of instruments, dresses, dances, or actions characterize ethnographic, geographic, or demographic music, or (ii) objects or scenes (e.g., Christmas trees, Santa Claus) detected in video can help identify event related music (e.g. Christmas music). There are two approaches to detect visual patterns from video commonly referred to as (a) supervised learning, (b) unsupervised learning, in machine learning literature.

In approach (a), positive and negative visual examples of each type of pattern (e.g. a dress, dance, or action) are provided to a classifier that learns to detect such patterns in video. An example of a supervised learning based approach for visual pattern recognition is found in the published article of Jun Yang, Rong Yan, and Alexander G. Hauptmann, Cross-Domain Video Concept Detection Using Adaptive SVMs, ACM International Conference on Multimedia, 2007.

In approach (b), visual patterns automatically emerge in the form of clusters or groups in a pool of videos from a particular theme. Compact clusters with high cardinality and low intra-cluster distance can be regarded as determinants of characteristic patterns for the theme. An example of unsupervised clustering of video for activity detection is found in the published article of Pavan K. Turaga, Ashok Veeraraghavan and Rama Chellappa, From Videos to Verbs: Mining Videos for Activities Using a Cascade of Dynamical Systems, IEEE International Conference on Computer Vision and Pattern Recognition, 2007.

Visual features include visual information extracted from video patterns to achieve classification or clustering (as explained above). Visual features can also include classification scores or cluster identities or some other cluster defining metrics (such as cardinality of cluster or intra-cluster distance). Such visual features can further corroborate the relevance and representativeness of the music (in the video) for a given theme. However, videos with music often contain edited tracks and so visual features should be used with caution.

The owners or the contributors of videos often associate semantic labels or tags with them that assist in text based or keyword based search. Some of the metadata tags may be more relevant to others for a given theme including the name of the artist, salient terms such as "folk" or "traditional". Salient metadata tags can assist in characterizing music for a given theme. In an embodiment of the present invention, a term-frequency-inverse-document-frequency (tf-idf) based tag weighting approach (such as described in the published article of Gerard Salton, Christopher Buckley, Term-weighting Approaches in Automatic Text Retrieval, Information Processing & Management, Elsevier, 1988) is used to assign saliency scores to tags within a pool of videos that have been searched using a theme-related keyword. These tf-idf saliency scores are the metadata features in the present invention. Videos with salient tags are expected to be representative for the particular theme.

Still referring to FIG. 2, the extracted music tracks and audio, visual, or metadata features 260 are used to select representative music in step 270. Inference can be made based on features of a single modality, or a combination of modalities. In order to employ two or more modalities for making inference, an embodiment of the present invention uses feature fusion. Fusion can be performed at three levels: feature level, score level and decision level. Feature level fusion performs concatenation of features from all three modalities to form a unified feature vector. Score level fusion uses the output scores from multiple classifiers across all modalities and feeds them to a fusion or meta classifier. Decision level fusion trains a fusion classifier that takes the prediction from all three modalities to come up with a compound decision.

A useful (but not necessary) step towards selecting representative music is to learn a transformed metric space wherein Euclidian distances between feature vectors closely matches the human perceptual definition of closeness. In this regard, a preferred embodiment of the present invention employs metric leaning, as described in the published article of Kilian Q. Weinberger et al., "Distance metric learning for large margin nearest neighbor classification", Neural Information Processing Systems, 2006, to learn a distance measure between feature vectors that more closely matches the human perceptual distance.

Figure 3:
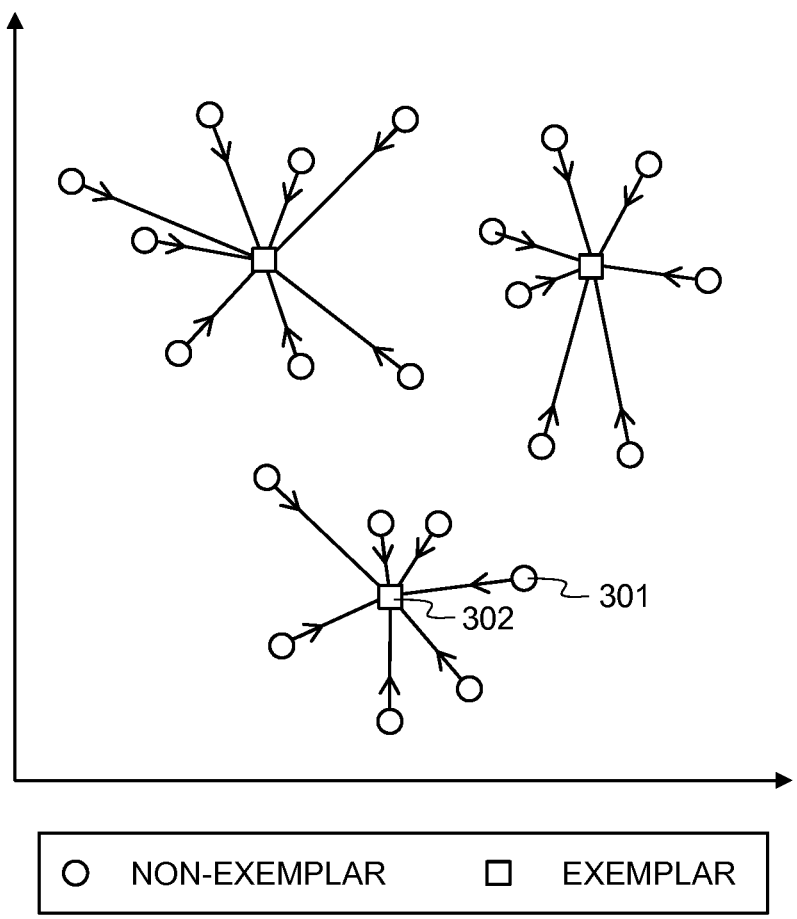
FIG. 3 is a pictorial illustration of the process of selecting a representative music track from a pool of related music tracks according to the present invention.

Referring now to FIG. 3, there is an illustration of the process for selecting representative music from a pool of music tracks extracted from videos retrieved by a theme-related keyword. This process is based on a technique called affinity propagation by Brendan J. Frey and Delbert Dueck, "Clustering by Passing Messages between Data Points." Science 315, 972-976, February 2007.

Although in general the audio, visual, or metadata features used in the present invention are of higher dimensionality than two, the affinity propagation is illustrated for two-dimensional data points, where negative Euclidean distance (squared error) was used to measure similarity. Each point is colored according to the current evidence that it is a cluster center (exemplar). The darkness of the arrow directed from point i to point k corresponds to the strength of the transmitted message that point i belongs to exemplar point k. When the iterative process of affinity propagation is completed upon convergence, cluster structures are detected where each cluster 301 contains data points that are inherently related to each other within the cluster 301, which is likely to correspond to a distinctive theme. Furthermore, within each cluster 301, a cluster center 302 emerges as an exemplar or representative of the cluster 301, which is then selected as the music representative of the corresponding theme.

Figure 4:
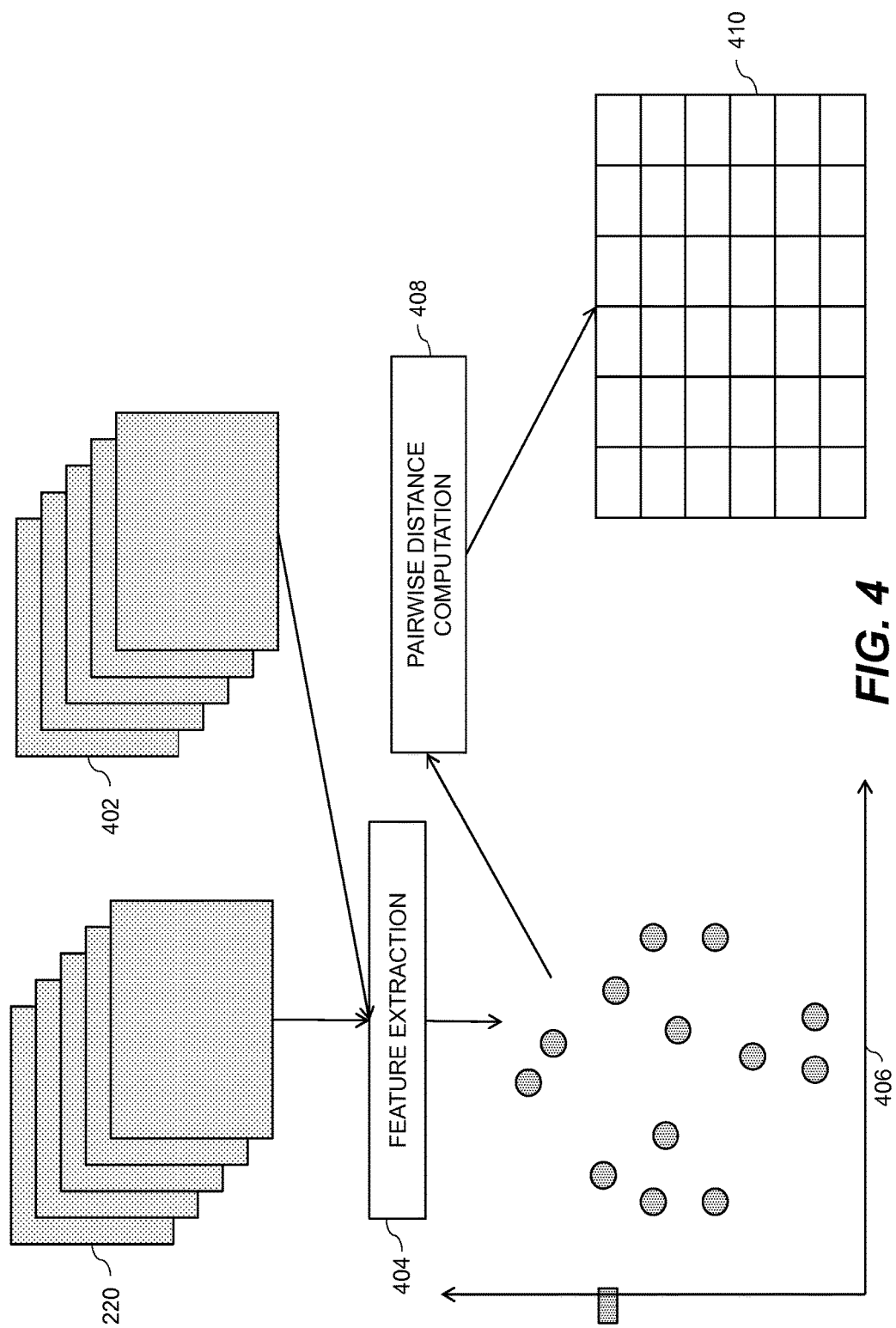
FIG. 4 is a pictorial illustration of an alternative process of selecting a representative music track from a pool of related music tracks according to the present invention.

In an alternative embodiment of the present invention, clustering is not employed. Referring now to FIG. 4, there is a set of videos 402 known to be related to the themes. Retrieved videos 220 by theme-related keywords (these retrieved videos also contain music tracks) are compared to the known thematically related videos 402 in order to determine if the retrieved videos 220 are relevant to the theme. To that end, video features are extracted in step 404. Using a metric representation of video feature space 406, retrieved videos 220 are compared to known thematically related videos 402 through pairwise distance computation 408 (e.g., using Euclidean distance or Mahalanobis distance). The resulted pairwise distance matrix 410 indicates which semantic theme the retrieved video 220 corresponds to. Subsequently, the music track of the retrieved video 220 is extracted and selected as a representative of the corresponding theme.

Once thematically representative music tracks are selected according to the present invention, such music tracks can be first stored in processor accessible memory in step 280 of FIG. 2. Alternatively, identifiers of the selected representative music tracks are stored rather than the music tracks themselves.

Later, an indexed music repertoire can be created by storing a collection of representative music tracks corresponding to a set of theme-related keywords. Furthermore, a thematically representative music track can be incorporated in a video or a slide show of images. It is also possible to use the selected representative music to replace the existing soundtrack in a video to better match the user intent.

Furthermore, such thematically representative music tracks can be subsequently purchased in response to thematic search requests. A music album of the theme can also be produced based on multiple thematically representative music tracks.

The present invention can be used to search directly in a keyword-indexed music repository to retrieve audios associated with the theme-related keyword. In this case, audio features or metadata features are extracted from the selected audios. Next, representative music related to the theme are then selected from the extracted audios using the extracted features, and stored in a processor accessible memory.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

100 System
110 Data processing system
120 Peripheral system
130 User interface system
140 Processor-accessible memory system
210 Use a theme-related keyword to search a keyword-indexed video repository step
220 Retrieved videos
230 Analyze retrieved videos to select videos with music step
240 Videos with music
250 Extract music tracks and features from the music videos step
260 Extracted music tracks and features
270 Select representative music step
280 Store representative music in processor accessible memory step 301 A cluster
302 A cluster center
402 Videos known to be related to the themes
404 Feature Extraction
406 A metric representation of video feature space
408 Pairwise distance computation
410 Pairwise distance matrix

The invention claimed is:

1. A system for automatically selecting thematically representative music, comprising:
a processor configured to:
retrieve a set of videos related to a set of themes;
search, based at least in part on a theme-related keyword, a keyword-indexed video repository to retrieve videos associated with the theme-related keyword;
analyze the retrieved videos and select videos including music from the retrieved videos;
extract video features from the selected videos;
compare the extracted video features of the selected videos to video features of the set of videos related to the set of themes to determine at least one of the selected videos that is thematically similar to at least one of the set of videos;
extract a music track of the determined at least one of the selected videos and select the music track as a representative of the corresponding theme; and
cause the selected representative music track to be stored in a processor accessible memory.

2. The system of claim 1, wherein the set of themes comprises an ethnographic theme, a geographic theme, a demographic theme, an event-based theme, or any combination thereof.

3. The system of claim 1, wherein each video included in the keyword-indexed video repository is associated with a respective keyword annotation.

4. The system of claim 1, wherein the processor is configured to extract the music track of the determined at least one of the selected videos using an FFmpeg open source software library.

5. The system of claim 4, wherein the processor is configured to pass the music track through a feature extraction algorithm configured to reduce sound information of the music track to a 32-element vector of numbers as a descriptive feature of the music track.

6. The system of claim 5, wherein the processor is configured to determine a tempo, a time signature, a key, and a mode of the music track based at least in part on the 32-element vector of numbers.

7. The system of claim 1, wherein the processor is configured to extract the video features from the selected videos using a supervised machine learning technique.

8. The system of claim 1, wherein the processor is configured to extract the video features from the selected videos using an unsupervised machine learning technique.

9. The system of claim 1, wherein the processor is configured to select the music track the representative of the corresponding theme based at least in part on a feature fusion technique.

10. The system of claim 9, wherein the processor is configured to concatenate features of the music track and the extracted video features at a feature level, a score level, and a decision level, as the feature fusion technique.

11. A computer-implemented method for automatically selecting thematically representative music, comprising:
accessing, via a processor, a set of videos related to a set of themes;
searching, via the processor, a keyword-indexed video repository based at least in part on a theme-related keyword to retrieve videos associated with the theme-related keyword;
analyzing, via the processor, the retrieved videos and selecting videos including music from the retrieved videos;
extracting, via the processor, video features from the selected videos;
comparing, via the processor, the extracted video features of the selected videos to video features of the set of videos related to the set of themes to determine at least one of the selected videos that is thematically similar to at least one of the set of videos;
extracting, via the processor, a music track of the determined at least one of the selected videos and selecting the music track as a representative of the corresponding theme; and
causing, via the processor, the selected representative music track to be stored in a processor accessible memory.

* * * * *